US009776711B2

(12) United States Patent
Luce

(10) Patent No.: US 9,776,711 B2
(45) Date of Patent: Oct. 3, 2017

(54) LANDING GEAR INCLUDING A COMPOSITE STRUT TUBE AND METHODS FOR ASSEMBLING THE SAME

(71) Applicant: GOODRICH CORPORATION, Charlotte, NC (US)

(72) Inventor: William E. Luce, Colleyville, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 209 days.

(21) Appl. No.: 14/818,976

(22) Filed: Aug. 5, 2015

(65) Prior Publication Data

US 2017/0036757 A1 Feb. 9, 2017

(51) Int. Cl.
| B64C 25/10 | (2006.01) |
| B64C 25/02 | (2006.01) |
| B64C 25/12 | (2006.01) |

(52) U.S. Cl.
CPC .............. B64C 25/10 (2013.01); B64C 25/02 (2013.01); B64C 25/12 (2013.01); *B64C 2025/125* (2013.01)

(58) Field of Classification Search
CPC ......... B64C 25/12; B64C 25/02; B64C 25/10; B64C 25/20; B64C 2025/125; B64C 25/00; B64C 25/405
See application file for complete search history.

(56) References Cited

U.S. PATENT DOCUMENTS

| 2,690,888 | A | * | 10/1954 | Hawkins, Jr. | ........... | B64C 25/14 |
| | | | | | | 244/102 R |
| 3,759,468 | A | * | 9/1973 | Boehringer | ............. | B64C 25/34 |
| | | | | | | 244/102 R |
| 4,228,975 | A | * | 10/1980 | Sealey | .................... | B64C 25/14 |
| | | | | | | 244/102 R |
| 4,720,063 | A | * | 1/1988 | James | .................... | B64C 25/14 |
| | | | | | | 244/102 R |
| 5,086,995 | A | | 2/1992 | Large | | |
| 7,954,757 | B2 | | 6/2011 | Moe | | |
| 2006/0237584 | A1 | * | 10/2006 | Hinton | ................... | B64C 25/12 |
| | | | | | | 244/102 R |
| 2011/0308702 | A1 | * | 12/2011 | Serey | ..................... | B29C 70/24 |
| | | | | | | 156/93 |

FOREIGN PATENT DOCUMENTS

| EP | 1041000 | 10/2000 | |
| FR | 2800705 | 5/2001 | |
| FR | 2800705 | * 11/2001 | ............. B64C 25/12 |
| WO | 2013107651 | 7/2013 | |

OTHER PUBLICATIONS

'Description FR2800705Translation'.*
Extended European Search Report dated Jan. 10, 2017 in European Application No. 16182411.5.

* cited by examiner

*Primary Examiner* — Assres H Woldemaryam
(74) *Attorney, Agent, or Firm* — Timothy Buckley; Snell & Wilmer L.L.P.

(57) ABSTRACT

A landing gear is provided. The landing gear includes a composite strut tube having a first lug and a second lug thereon. A first brace is coupled to the composite strut tube with a first two-force member via the first lug and a second brace is coupled to the composite strut tube with a second two-force member via the second lug. A method for assembling the landing gear is also provided.

15 Claims, 3 Drawing Sheets

LANDING GEAR INCLUDING A COMPOSITE STRUT TUBE AND METHODS FOR ASSEMBLING THE SAME

FIELD

The present disclosure relates to landing gear and more particularly, to landing gear including a composite strut tube and methods for assembling the same.

BACKGROUND

Conventional landing gear geometry used for aircraft landing gear that includes metal strut tubes and other metal structural components is not suitable for building landing gear that includes composite strut tubes. For example, lugs that are mounted to or integral with a composite strut tube tend to offer poor support against loads that are not normal to the composite strut tube centerline. As loads may be applied to a composite strut tube at non-perpendicular angles, the lugs may be susceptible to undesirable displacement on the composite strut tube.

SUMMARY

A landing gear for an aircraft is provided in accordance with various embodiments. The landing gear comprises a composite strut tube having a first lug and a second lug thereon. A first brace is coupled to the composite strut tube with a first two-force member via the first lug and a second brace is coupled to the composite strut tube with a second two-force member via the second lug.

A landing gear for an aircraft is provided in accordance with various embodiments. The landing gear comprises a shock strut assembly comprising a composite strut tube and a piston at least partially receivable in the composite strut tube. A folding brace comprising a first two-force member is coupled to the composite strut tube via a first lug on the composite strut tube. A fixed brace is coupled to the composite strut tube with a second two-force member via a second lug on the composite strut tube.

A method for assembling a landing gear is provided according to various embodiments. The method comprises coupling a folding brace comprising a first two-force member to the composite strut tube via a first lug on the composite strut tube and coupling a fixed brace to the composite strut tube with a second two-force member comprising a side strut via a second lug on the composite strut tube.

In any of the foregoing embodiments, the first brace comprises a folding brace and the first two-force member comprises a horizontal beam of the folding brace. The horizontal beam has a first end portion coupled to the composite strut tube via the first lug and a second end portion coupled to a vertical beam and a locking beam that is coupled via a shock strut pivot to the composite strut tube. The second brace comprises a fixed brace and the second two-force member comprises a side strut. The first and second two-force members are disposed normal to the composite strut tube when the landing gear is in a deployed position. The fixed brace comprises a planar triangular member with an apex thereof coupled to the composite strut tube by the second two-force member comprising the side strut. The planar triangular member comprises a single panel or the planar triangular member has a first side, a second side, and a third side, the first side and the second side comprising a pair of two-force beam members and the third side comprising a trunnion beam on which the composite strut tube is mounted. The composite strut tube and the first and second braces define a landing gear geometry that aids in preventing an introduction of non-normal loads into the composite strut tube. In response to retraction, the landing gear initially moves in a first direction away from the aircraft and then reverses to a second direction toward the aircraft.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

Figure 1:
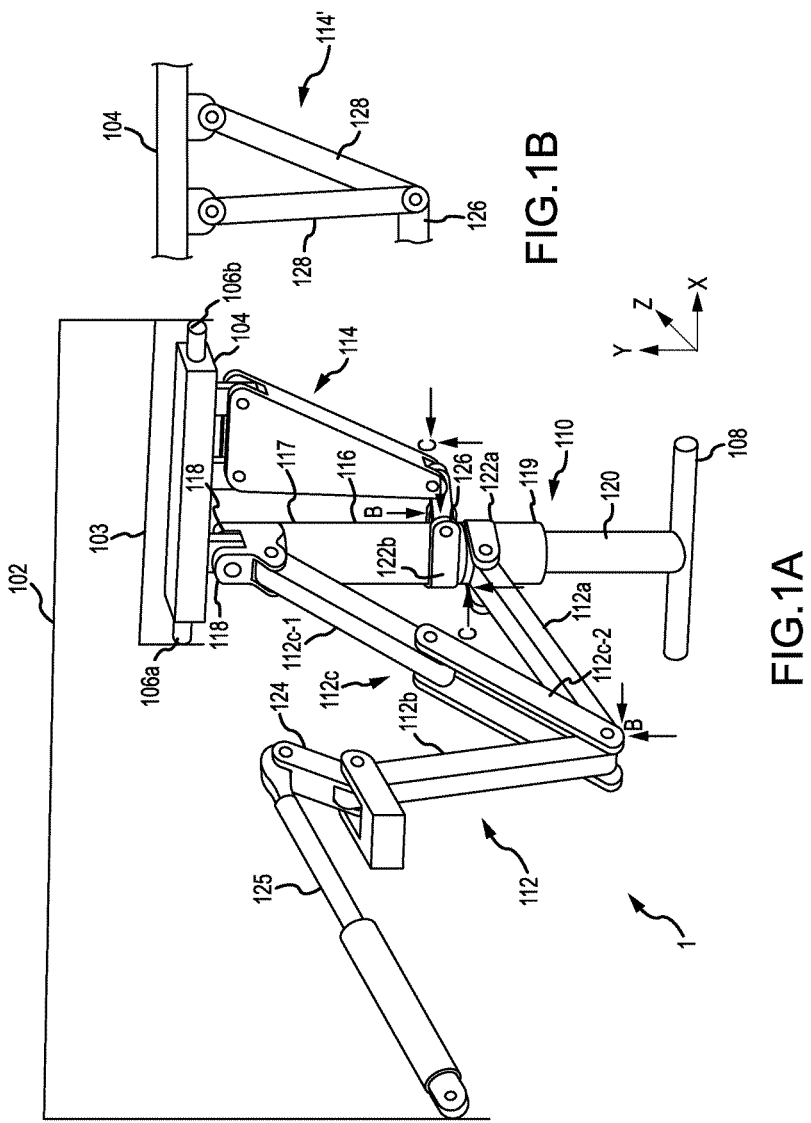
FIG. 1A is an isometric view of a landing gear (the wheels and torque arms have been omitted for ease of illustration) in a deployed configuration in accordance with various embodiments, the landing gear including a shock strut assembly including a composite strut tube coupled to a folding brace and a fixed brace.
FIG. 1B is a planar view depicting an alternative fixed brace for the landing gear of FIG. 1A, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Various embodiments are directed to landing gears including a composite strut tube and methods for assembling the same. In various embodiments, the systems and methods disclosed herein tend to substantially prevent non-normal loads on a composite strut tube. The landing gear geometry according to various embodiments tends to substantially prevent the introduction of non-normal loads into the composite strut tube and directs loads into the tube that are normal (perpendicular) to the composite strut tube centerline. As a result, the landing gear geometry as described in the present disclosure permits the use of a composite strut tube in the landing gear, providing a weight advantage over landing gear comprising metallic strut tubes. In addition, where a lug is coupled to a composite strut tube in a manner that the lug cannot support loads that are not normal to the composite strut tube centerline, the landing gear geometry as described in the present disclosure now permits coupling in such manner.

FIG. 1A shows a landing gear 1 according to various embodiments in the deployed configuration. The landing gear 1 is deployed relative to an aircraft 102 and has been commanded or otherwise deployed from a stowage compartment or landing gear bay of the aircraft. In the deployed configuration, the landing gear is capable of supporting at least a portion of the aircraft's weight. The landing gear 1 comprises a trunnion beam 104 having two end portions 106a and 106b for attaching to a landing gear support structure 103 in the stowage compartment or landing gear bay. The landing gear 1 further comprises at least one axle 108 for carrying at least a pair of wheels. The landing gear 1 further comprises a shock strut assembly 110 for mounting the wheels to the landing gear support structure 103 on the aircraft. The shock strut assembly 110 is attached to the aircraft through the trunnion beam 104 and through a folding brace 112 and a fixed brace 114/114' coupled to a lower end portion of the composite strut tube 116. The optimal brace locations are dependent on the type of aircraft installation.

Still referring to FIG. 1A, according to various embodiments, the shock strut assembly 110 comprises a composite strut tube 116 having an upper end portion 117 (the upper end portion 117 of the composite strut tube 116 is the portion of the composite strut tube proximate to the aircraft 102 and a lower end portion 119 of the composite strut tube 116 is the portion more remote to the aircraft 102) pivotally mounted at a shock strut pivot 118 (also known herein as "an attachment lug") to the trunnion beam 104. The shock strut assembly 110 further includes a piston 120 at least partially receivable within the composite strut tube 116 (forming a piston/cylinder assembly of a shock absorber wherein the piston 120 is configured to translate with respect to the composite strut tube 116). The piston 120 communicates forces to and from the axle 108 along a y axis as depicted in FIG. 1A. The composite strut tube 116 receives the piston 120 in a manner that permits relative telescoping movement between the composite strut tube and the piston to absorb, transfer, and/or dampen inertial, impact, operational and/or other forces that may be transmitted from the landing gear and/or the aircraft to a ground surface, such as, but not limited to a runway, tarmac or takeoff surface. The composite strut tube 116 may comprise one or more composite materials. Exemplary composite strut tubes include at least one of a filament wound composite strut tube, a filament braided composite strut tube, and a composite strut tube of laid up filament. The composite strut tube 116 has a first lug 122a and a second lug 122b thereon for respectively coupling the folding brace 112 and the fixed brace 114/114' to the composite strut tube 116 as hereinafter described. The first lug and the second lug may be comprised of a metal or composite material that is the same as or different from the composite material of the composite strut tube. The first lug and the second lug may be mounted on the composite strut tube 116 or formed integrally as one-piece with the composite strut tube 116.

Still referring to FIG. 1A, according to various embodiments and as noted above, the landing gear 1 further comprises a first brace (the folding brace 112) and a second brace (e.g., the fixed brace 114). The first and second braces operate to stabilize the landing gear in the deployed position. In the depicted embodiment, the folding brace 112 is coupled to the composite strut tube 116 with a first two-force member comprising a horizontal beam 112a of the folding brace 112 via the first lug 122a. The first two-force member is generally normal to the composite strut tube when the landing gear is in the deployed position.

The folding brace 112 extends between the composite strut tube 116 and the aircraft 102. While FIG. 1A depicts a fixed side brace and a folding drag brace, it is to be understood that the folding brace may be a folding side brace and the fixed brace may be a fixed drag brace. The horizontal beam 112a of folding brace 112 is pivotally coupled to a vertical beam 112b, and the horizontal beam 112a and vertical beam 112b are in turn pivotally coupled to a locking beam 112c as now described in more detail. The locking beam 112c comprises an upper locking beam 112c-1 and a lower locking beam 112c-2. The locking beam 112c and the vertical beam 112b together form a truss thereby helping to stabilize the landing gear in the deployed configuration or position. The horizontal beam (i.e., the first two-force member) 112a has a first end portion pivotally coupled to the composite strut tube 116 by the first lug 122a and a second end portion pivotally coupled to a first end portion of the vertical beam 112b and of the lower locking beam 112c-2. The vertical beam 112b has a second end portion pivotally coupled to a linkage arm 124 coupled to a retraction actuator 125 that may be attached to the landing gear support structure, permitting the retraction actuator 125 to pull the landing gear up (i.e., retract the landing gear) using the horizontal beam 112a. While the second portion of vertical beam is described as pivotally coupled to the linkage arm 124, it is to be understood that vertical beam 112b and the linkage arm 124 may be one-piece that are not pivotally coupled together.

The upper locking beam 112c-1 has a first end portion pivotally coupled to the shock strut pivot (the attachment lug) 118 at the upper end portion 117 of the composite strut tube 116 and a second end portion pivotally coupled to a second end portion of the lower locking beam 112c-2. The lower locking beam 112c-2 includes forked arms sized to receive and be pivotally coupled to the second end portion of the upper locking beam 112c-1 and to receive and be pivotally coupled to the second end portion of the horizontal beam 112a and the first end portion of the vertical beam 112*b*. As used herein, a "beam" may refer to a solid object that is much longer than it is wide or thick (width and thickness form the cross-sectional area, perpendicular to the long axis of the beam). The material of the beam may be strong enough so that the beam is capable of supporting a load. For example, each beam may be all composite, composite/metallic, and/or all metallic.

While the terms "horizontal" and "vertical" are used herein to describe beams of the folding brace 112, it is to be understood that the "horizontal beam" of the folding brace is not "horizontal" (a plane that is substantially parallel to the plane of the horizon along the x-axis) and the "vertical beam" is not "vertical" (a plane that is at a right angle to the horizontal plane (i.e., along the y-axis)) when the landing gear is in a retracted position (see FIG. 2)) as hereinafter described. It is also to be understood that, when the landing gear is in the deployed position, the folding brace is capable of locking into position by a locking mechanism as known to one skilled in the art.

Various embodiments of the fixed brace are shown respectively in FIG. 1A (the fixed brace is referred to in FIG. 1A as 114) and 1B (the fixed brace is referred to in FIG. 1B as 114'). As noted previously, the fixed brace 114/114' may be a fixed drag brace or a fixed side brace. The fixed brace 114/114' comprise a planar triangular member or truss mounted at an upper portion to the trunnion beam 104 and at an apex thereof, to the lower end portion 119 of the composite strut tube 116 with a second two-force member. The fixed brace 114' includes the trunnion beam 104. In the depicted embodiments, the second two-force member comprises a side strut 126. The second two-force member is generally normal to the composite strut tube when the landing gear is in the deployed position. The side strut 126 has a first end portion pivotally coupled to the second lug 122*b* on the lower end portion 119 of the composite strut tube 116 via a pivot pin and a second end portion pivotally coupled to the apex of the fixed brace 114/114' by a pivot pin. The side strut 126 aids in preventing landing gear deflections from introducing large non-normal loads to the coupling between the composite strut tube 116 and the fixed brace 114/114'.

The planar triangular member (the fixed brace 114) in FIG. 1A comprises a single panel. The planar triangular member (the fixed brace 114') in FIG. 1B comprises a pair of individual two-force members 128 pivotally mounted to the trunnion beam 104. As noted previously, fixed brace 114' includes the trunnion beam 104. The individual two-force members comprise beams (hereinafter "two-force beam members"). In fixed brace 114', the individual two-force beam members 128 along with the trunnion beam 104 form the three sides (a first side, a second side, and a third side) of the planar triangular member.

As used herein, the term "two-force member" refers to a structural element that has attachment features such as pins or hinge supports at both ends and carries no load in-between. The two-force members convert loads that are not normal to the composite strut tube geometric centerline into loads that are normal to the composite strut tube geometric centerline. The two-force member may have forces acting on it at only two points. For any two-force member of a structure, summing moments about either of the two points where a force is applied will show that because the net moment about that point is zero, the force at the other point cannot have a component perpendicular to the line connecting the two points. In effect, the force transmitted is parallel to the line connecting the two points. Therefore, the two-force members (e.g., 112*a* and 126, respectively) coupling the folding brace 112 and the fixed brace 114/114' to the composite strut tube 116 introduce only loads normal to the composite strut tube 116.

The function of the two-force members in the landing gear according to various embodiments may be explained by further reference to FIG. 1A. If the first and second two-force members 112*a* and 126 are isolated, it can be seen that they each have forces (indicated with arrows) acting at only points B and C. The line of action of the force at point C must also pass through point B; similarly a force at point B must also pass through point C. If the force at B did not pass through the point C, the force would cause a moment about point C and equilibrium would not be possible. The two forces are equal in magnitude, co-linear, and opposite in sense. Thus, the horizontal beam 112*a* and the side strut 126 are two-force members as forces act only at B and C thereof.

Figure 2:
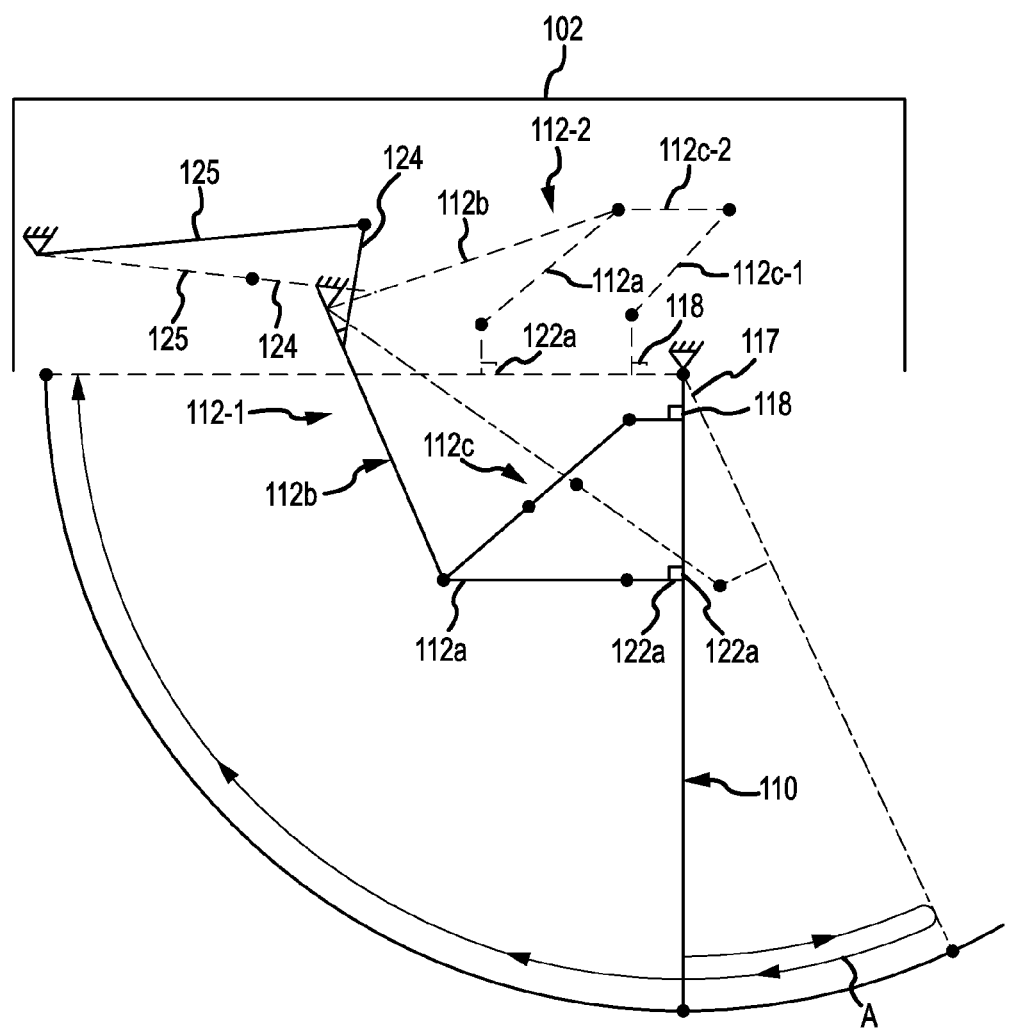
FIG. 2 is a schematic view of the folding brace relative to the shock strut assembly when the landing gear is in the deployed position (solid lines) and moves to a retracted position (dotted lines) in accordance with various embodiments.

FIG. 2 depicts how the landing gear geometry as described in the present disclosure retracts in accordance with various embodiments. More particularly, FIG. 2 is a schematic view of the folding brace 112 relative to the shock strut assembly 110 when the landing gear 1 is in a deployed position (solid lines) and moves to a retracted position (dashed lines) in accordance with various embodiments. The folding brace 112 of the deployed landing gear such as depicted in FIG. 1A is identified in FIG. 2 as folding brace 112-1. The folding brace 112 of the retracted landing gear in FIG. 2 is identified as folding brace 112-2. When the landing gear moves between the deployed position and the retracted position, the folding brace 112 "folds" toward the aircraft 102 as depicted in FIG. 2 and away from the ground surface, with the horizontal beam 112*a* moving from the plane that is substantially parallel to the plane of the horizon, the vertical beam 112*b* moving from the plane that is at a right angle to the horizontal plane, and the locking beam 112*c* moving from its deployed position into the retracted position as depicted in dotted lines in FIG. 2. Unlike conventional landing gear that moves in one direction only when retracting, the landing gear 1 according to various embodiments initially moves in a first direction away from the aircraft and then reverses to a second direction toward the aircraft as shown by retraction path arrow A. It is recognized that, during retraction, the horizontal beam 112*a* may introduce short-term non-normal loads (e.g., side forces and drag forces) to the composite strut tube centerline, but at an acceptable level that can be tolerated by the landing gear geometry as described in the present disclosure.

While a fixed brace as the second brace has been described, it is to be understood that the second brace may be a folding brace (similar or identical to folding brace 112), with the first (folding) brace comprising a drag folding brace and the second folding brace comprising a side folding brace. If a folding brace is used as the second brace instead of the fixed brace, the second two-force member comprises a horizontal beam (similar or identical to horizontal beam 112*a* of folding brace 112).

The landing gear 1 as described in the present disclosure has a geometry that directs both side loads and drag loads into the composite strut tube 116 in a direction normal to the composite strut tube centerline, thereby enabling the lugs on the composite strut tube to support significant loads that are not normal to the composite strut tube centerline and enabling use of a composite strut tube to lower weight relative to conventional landing gears including metallic strut tubes. In addition, the braces (fixed and folding) in combination with the two-force members are oriented in such a manner relative to the composite strut tube to maintain the position of the shock strut assembly in the deployed position when the landing gear is landing, taking-off, taxiing, and being handled on the ground.

Figure 3:
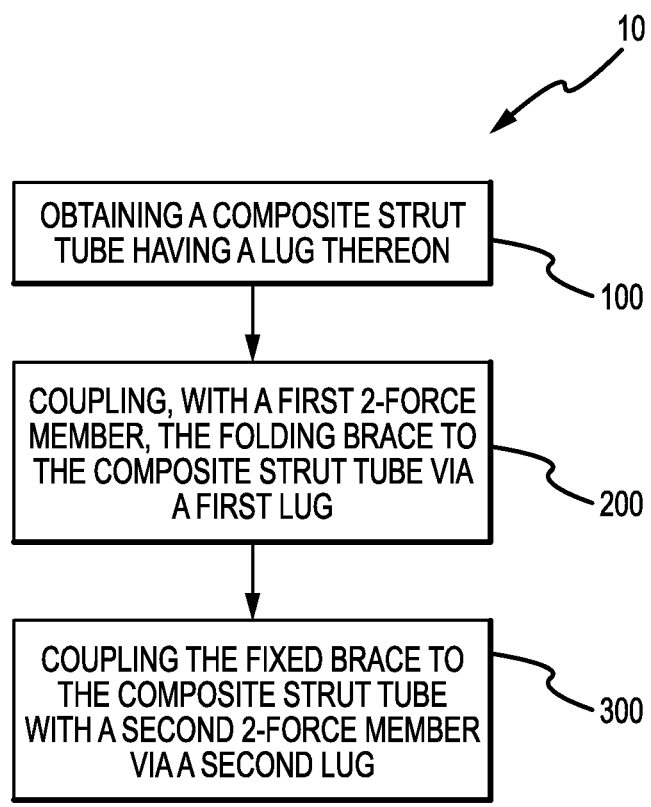
FIG. 3 is a flowchart illustrating an exemplary method for assembling the landing gear to substantially prevent non-normal loads on the composite strut tube thereof, according to various embodiments.

Referring now to FIG. 3, according to various embodiments, a method 10 for assembling the landing gear is also provided in accordance with various embodiments. The method 10 for assembling the landing gear begins by obtaining the composite strut tube having a lug thereon (step 100). Method 10 for assembling the landing gear continues by coupling, with the first two-force member, the folding brace comprising the first two-force member to a composite strut tube via the first lug on the composite strut tube (step 200). Method 10 for assembling the landing gear continues by coupling the fixed brace to the composite strut tube with the second two-force member via the second lug on the composite strut tube (step 300). Steps 200 and 300 may be performed in any order or simultaneously. While coupling of the braces in their entirety to the composite strut tube has been described, it is to be understood that the first and second two-force members may be coupled via the first and second lugs respectively to the composite strut tube followed by assembly of the braces in their entirety. The coupling steps 200 and 300 may be performed prior to, after, or simultaneously with assembling the composite strut tube into the shock strut assembly, i.e., the obtained composite strut tube may be already assembled into the shock strut assembly prior to the coupling steps.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A landing gear for an aircraft, the landing gear comprising:
   a composite strut tube having a first lug and a second lug thereon; and
   a first brace coupled to the composite strut tube with a first two-force member via the first lug and a second brace coupled to the composite strut tube with a second two-force member via the second lug, wherein the second brace comprises a fixed brace and the second two-force member comprises a side strut, wherein the fixed brace comprises a planar triangular member with an apex thereof coupled to the composite strut tube by the second two-force member.

2. The landing gear of claim 1, wherein the first brace comprises a folding brace and the first two-force member comprises a horizontal beam of the folding brace.

3. The landing gear of claim 2, wherein the horizontal beam has a first end portion coupled to the composite strut tube via the first lug and a second end portion coupled to a vertical beam and a locking beam that is coupled via a shock strut pivot to the composite strut tube.

4. The landing gear of claim 1, wherein the first and second two-force members are disposed normal to the composite strut tube when the landing gear is in a deployed position.

5. The landing gear of claim 1, wherein the planar triangular member comprises a single panel.

6. The landing gear of claim 1, wherein the planar triangular member has a first side, a second side, and a third side, the first side and the second side comprising a pair of two-force beam members and the third side comprising a trunnion beam on which the composite strut tube is mounted.

7. The landing gear of claim 1, wherein the composite strut tube and the first and second braces define a landing gear geometry that aids in preventing an introduction of non-normal loads into the composite strut tube.

8. The landing gear of claim 1, wherein in response to retraction, the landing gear initially moves in a first direction away from the aircraft and then reverses to a second direction toward the aircraft.

9. A landing gear for an aircraft, the landing gear comprising:
   a shock strut assembly comprising a composite strut tube and a piston at least partially receivable in the composite strut tube;
   a folding brace comprising a first two-force member coupled to the composite strut tube via a first lug on the composite strut tube; and
   a fixed brace coupled to the composite strut tube with a second two-force member via a second lug on the composite strut tube,
   wherein the first two-force member comprises a horizontal beam of the folding brace and the second two-force member comprises a side strut and wherein the fixed brace comprises a planar triangular member with an apex thereof coupled to the composite strut tube by the side strut and wherein the planar triangular member has a first side, a second side, and a third side, the first side and the second side comprising a pair of two-force beam members and the third side comprising a trunnion beam on which the composite strut tube is mounted.

10. The landing gear of claim 9, wherein the folding brace comprises the horizontal beam having a first end portion coupled to the composite strut tube and a second end portion coupled to a vertical beam and a locking beam comprising a lower locking beam coupled to the second end portion of the horizontal beam and to the vertical beam and an upper locking beam coupled to a shock strut pivot on the composite strut tube.

11. The landing gear of claim 9, wherein the planar triangular member comprises a single panel.

12. The landing gear of claim 9, wherein the shock strut assembly, the folding brace, and the fixed brace define a landing gear geometry that aids in preventing an introduction of non-normal loads into the composite strut tube.

13. The landing gear of claim 9, wherein, in response to retraction of the landing gear, the landing gear initially moves in a first direction away from the aircraft and then reverses to a second direction toward the aircraft.

14. A method for assembling a landing gear, the method comprising:
  coupling a folding brace comprising a first two-force member to the composite strut tube via a first lug on the composite strut tube of the landing gear; and
  coupling a fixed brace to the composite strut tube with a second two-force member comprising a side strut via a second lug on the composite strut tube of the landing gear, wherein the fixed brace comprises a planar triangular member with an apex thereof coupled to the composite strut tube by the second two-force member comprising the side strut.

15. The method of claim 14, wherein coupling the folding brace and coupling the fixed brace comprises coupling in a manner such that the first and second two-force members are disposed normal to the composite strut tube when the landing gear is in a deployed position.

* * * * *